United States Patent [19]

Morel

[11] Patent Number: 4,690,304

[45] Date of Patent: Sep. 1, 1987

[54] OBTURATING DEVICE FOR TUBES, FLASKS AND OTHER CONTAINERS, THE OPENING AND CLOSING OF WHICH ARE CONTROLLED THROUGH ROTATION

[76] Inventor: Simone Morel, 15 rue du Faubourg de Paris, 51210 Montmirail, France

[21] Appl. No.: 805,285

[22] Filed: Dec. 5, 1985

[30] Foreign Application Priority Data

Dec. 7, 1984 [FR] France ................ 84 18787
Mar. 6, 1985 [FR] France ................ 85 03292

[51] Int. Cl.$^4$ .................. B67D 5/22; B65D 47/30; G01F 11/32; B67B 7/48

[52] U.S. Cl. .................. 222/44; 222/83.5; 222/91; 222/153; 222/442; 222/453; 222/505; 222/520; 222/521; 222/545; 222/549

[58] Field of Search ........... 222/442, 448, 451, 453, 222/476, 505, 509, 546, 549, 153, 83, 83.5, 91, 207, 211, 212, 464, 47, 48, 521, 541, 546, 554, 506, 520, 519, 544, 545, 548, 552, 44; 251/252, 268

[56] References Cited

U.S. PATENT DOCUMENTS

| | | | |
|---|---|---|---|
| 3,010,619 | 11/1961 | Gronemeyer et al. | 222/521 |
| 3,204,836 | 9/1965 | Joffe | 222/548 X |
| 3,583,846 | 10/1969 | Kimball et al. | 222/44 X |
| 3,834,596 | 9/1974 | Brady et al. | 222/520 |
| 4,015,631 | 4/1977 | Hayes | 251/252 X |
| 4,065,037 | 12/1977 | Haller | 222/521 X |
| 4,261,487 | 4/1981 | Seager | 222/520 |
| 4,314,657 | 2/1982 | Perakis et al. | 222/442 X |
| 4,358,031 | 11/1982 | Lohrman | 222/521 X |
| 4,477,002 | 10/1984 | Stull | 222/520 X |
| 4,583,667 | 4/1986 | Fishman et al. | 222/44 X |

FOREIGN PATENT DOCUMENTS

291075 5/1953 Switzerland ................ 222/545

Primary Examiner—Joseph J. Rolla
Assistant Examiner—Nils E. Pedersen
Attorney, Agent, or Firm—Browdy and Neimark

[57] ABSTRACT

The obturating device for tubes, flasks and the like containers of fluids, comprises a valve-cap with a plate, said plate having an upper part with a secondary component protruding at said upper part, blades protruding in middle of an outlet passage for the fluid in order to maintain the secondary component, said plate downwardly extending into a fitting skirt for a neck of the container. The fitting skirt comprises an outer periphery with two diametrically opposed notches with said valve-cap being associated with a casing which comprises a plate having a central hole and an outer fitting skirt with two symmetrically opposed orientating inner ramps. The ramps are used as a bearing member for the notches of the valve-cap.

21 Claims, 16 Drawing Figures

OBTURATING DEVICE FOR TUBES, FLASKS AND OTHER CONTAINERS, THE OPENING AND CLOSING OF WHICH ARE CONTROLLED THROUGH ROTATION

BACKGROUND OF THE INVENTION

The present invention relates to an obturating device for tubes, flasks, and the like containers, the opening and closing of which are controlled by a rotation of a casing forming an outer face of the obturating device.

Tubes, flasks and the like containers used for conditioning products are conventionally provided with a closing cap which is removed upon using the container.

Obturating devices have however already been made for enabling to use the product contained therein without having to remove the closing cap. The present invention relates to a device of the type which is of a simple manufacturing and is easy to handle.

OBJECT OF THE INVENTION

The object of the invention is to provide an obturating device with a valve-cap and casing, and in which a rotation of the casing by a quarter of circumference enables to close or to open the hole of the container.

SUMMARY OF THE INVENTION

According to the invention, the obturating device for tubes, flasks and the like containers comprises a valve-cap with a plate, said plate having a secondary component protruding at the upper part, blades protruding in the middle of an outlet passage for the liquid in order to maintain the secondary component, said plate downwardly extending into a fitting skirt for a neck of the container, said fitting skirt comprising an outer periphery with two diametrically opposed side notches, said valve-cap being associated with a casing which comprises a plate having a central hole and an outer fitting skirt with two symmetrically opposed orientating inner ramps, said ramps being used as a bearing member for the side notches of the valve-cap, whereby opening and closing of the device are respectively made by rotating the casing.

Several other characteristic features of the invention will become more apparent from the following detailed description.

BRIEF DESCRIPTION OF THE DRAWINGS

Embodiments of the invention are shown by way of non limiting examples in the accompanying drawings, wherein.

DETAILED DESCRIPTION OF THE INVENTION

The obturating device according to the invention is formed of two parts: a valve-cap 1 is mounted on a neck 22 of a flask 15 and a casing 9 covers the valve-cap 1 and the neck 22.

The valve-cap 1 comprises a cylindrical plate 4 overtopped with a plug 5. The plug 5 is maintained by radial blades 6 in the middle of an outlet passage 11 provided in the casing 9 for a fluid contained in the flask 5. The plate 4 downwardly extends into a fitting skirt 4a having, on its outer periphery two diametrically opposed side notches 2 and 3. The casing 9 has a central hole 11 which is opened or closed according to whether the plug 5 of the valve-cap 1 obturates the central hole 11 or not.

The casing 9 extended into an outer fitting skirt 12 in the inner wall of which are formed opening ramps 16 and 21 in which can slide the above mentioned diametrically side opposed notches 2 and 3 of the valve-cap 1.

On the other hand, the casing 9 is provided with an inner tightness skirt 10 which is applied against a tightness skirt 8 of the valve-cap 1. The valve-cap 1 has itself a second tightness skirt 7 which is applied against the inner edge of the neck 22 of the flask 15.

As shown in the drawings, while the tightness skirt 3 of the valve cap 1 is cylindrical in shape, the inner tightness skirt 10 of the caasing is slightly downwardly tapered and is therefore substantially in the extension of the tightness skirt 8 of the valve cap. Samely the second tightness skirt 7 is also slightly downwardly tapered so as to be substantially in the extension of the cylindrical shaped neck 22 of the flask 15. Such cooperation of a cylindrical and a tapered parts improves tightness between the parts and furthermore enables an easier and better flow of the product along these parts.

In the embodiment of FIGS. 1, 2, 5, 6 and 7, the casing 9 is positioned in height on the neck 22 of the flask 15 by means of a horizontal plain ring 13 which can rotate in a groove 14 which is also horizontal and provided in the neck 22.

In the present embodiment, the valve-cap 1 raises or falls to respectively open or close the hole 11 of the casing by means of its opposed notches 2 and 3 bearingly rotating on the opposed ramps 16 and 21 when the casing is rotated.

Figure 4:
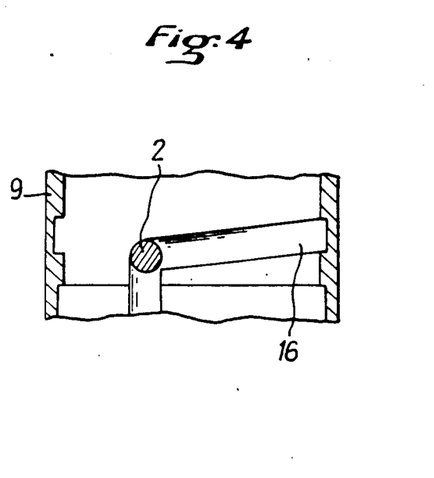
FIG. 4 is a partial vertical cross-section view of the casing showng an inner ramp.

According to FIG. 4, the notch 2 of the valve-cap 1 is introduced in the ramp 16 of the casing 9 through a vertical passage.

Figure 1:
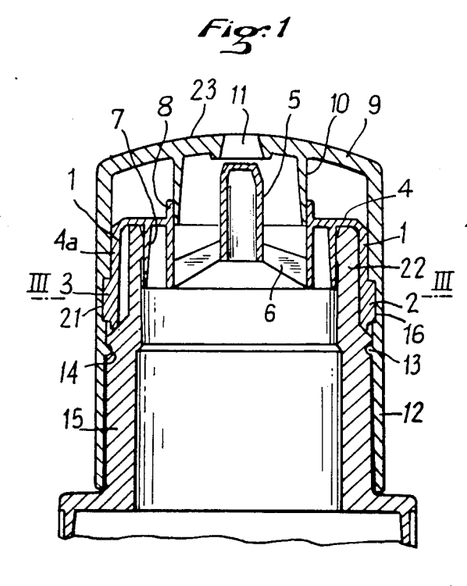
FIG. 1 is a vertical cross-section of the obturating device in an opened position.
Figure 2:
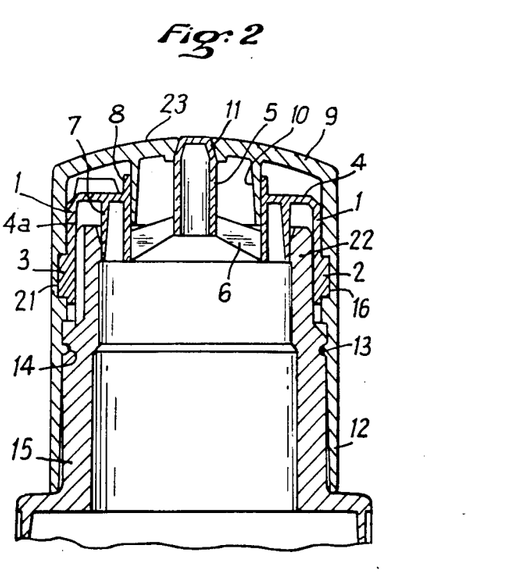
FIG. 2 is a vertical cross-section of the obturating device in a closed position.
Figure 3:
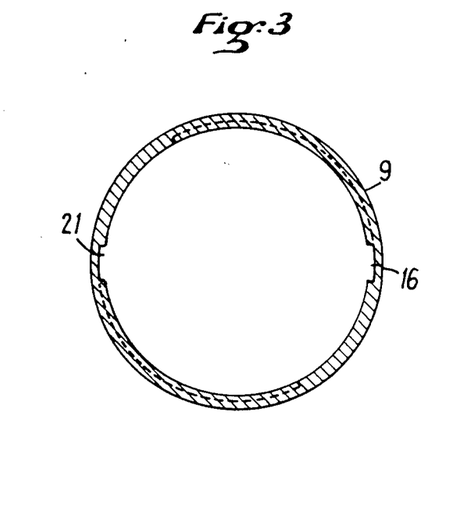
FIG. 3 is a partial cross-section of the device substantially taken along line III—III of FIG. 1.
Figure 5:
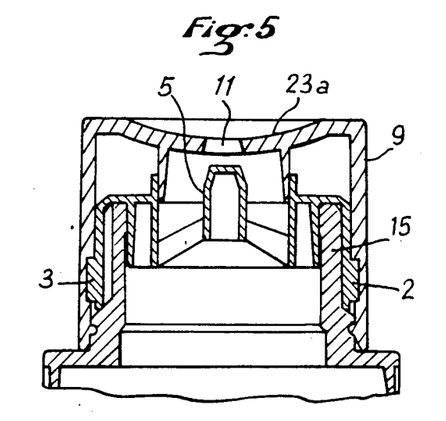
FIGS. 5, 6 and 7 shows variants of the obturating device.

FIG. 5 shows, in an opening position, an obturating device in which the casing 9 has an upper plate 23 which is a cup-shaped at 23a, instead of being bulged as in FIGS. 1 and 2.

Figure 6:
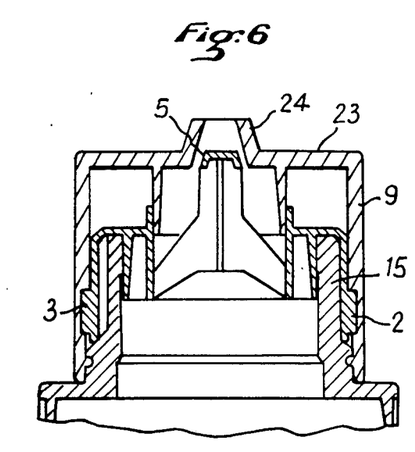

In the embodiment of FIG. 6, the obturating device shown in an opened position, is provided with a casing 9 having a flat upper plate 23 with a protruding pierced end part 24.

Figure 7:
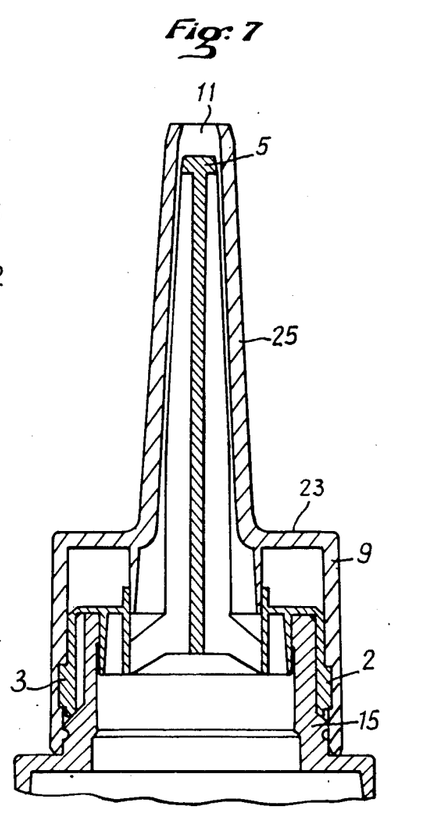

In FIG. 7, the outlet portion of the obturating device has a long tapered shape as shown at 25.

Figure 8:
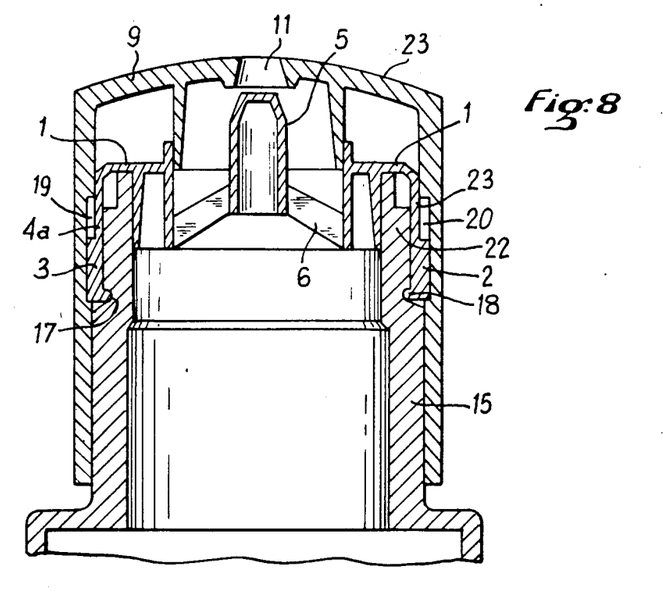
FIG. 8 is a vertical cross-section of a variant of embodiment of the obturating device in an opened position, the inner valve-cap being fixed to a neck of the flask.
Figure 9:
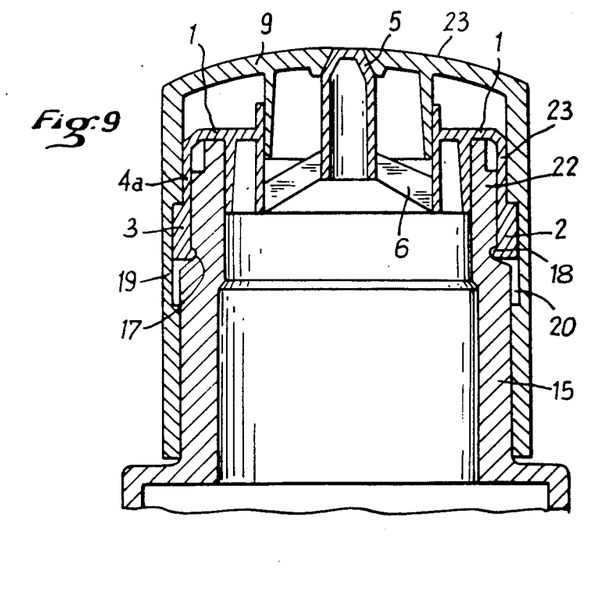
FIG. 9 shows the obturating device of FIG. 8 in a closed position.

In the variant of embodiment of FIGS. 8 and 9, the valve-cap 1 is fixed on the neck 22 of the flask 15 by means of an horizontal plane ring 18 inserted in a groove 17 formed in the neck 22. The opposed notches 2 and 3 of the valve-cap 1 slide in opposed ramps 19 and 20 of the casing 9. By a rotation of the casing 9, the casing 9 raises or falls with respect to the fixed valve-cap 1, in order to open (FIG. 8) or close (FIG. 9) the hole 11 provided in the casing 9.

In a preferred embodiment of the invention, closing and opening of the obturating device are made by a rotation of a quarter of a circumference of the casing 9 by suitably designing the opposed and cooperating notches and ramps provided respectively in the valve-cap and in the casing.

Figures 10, 11:
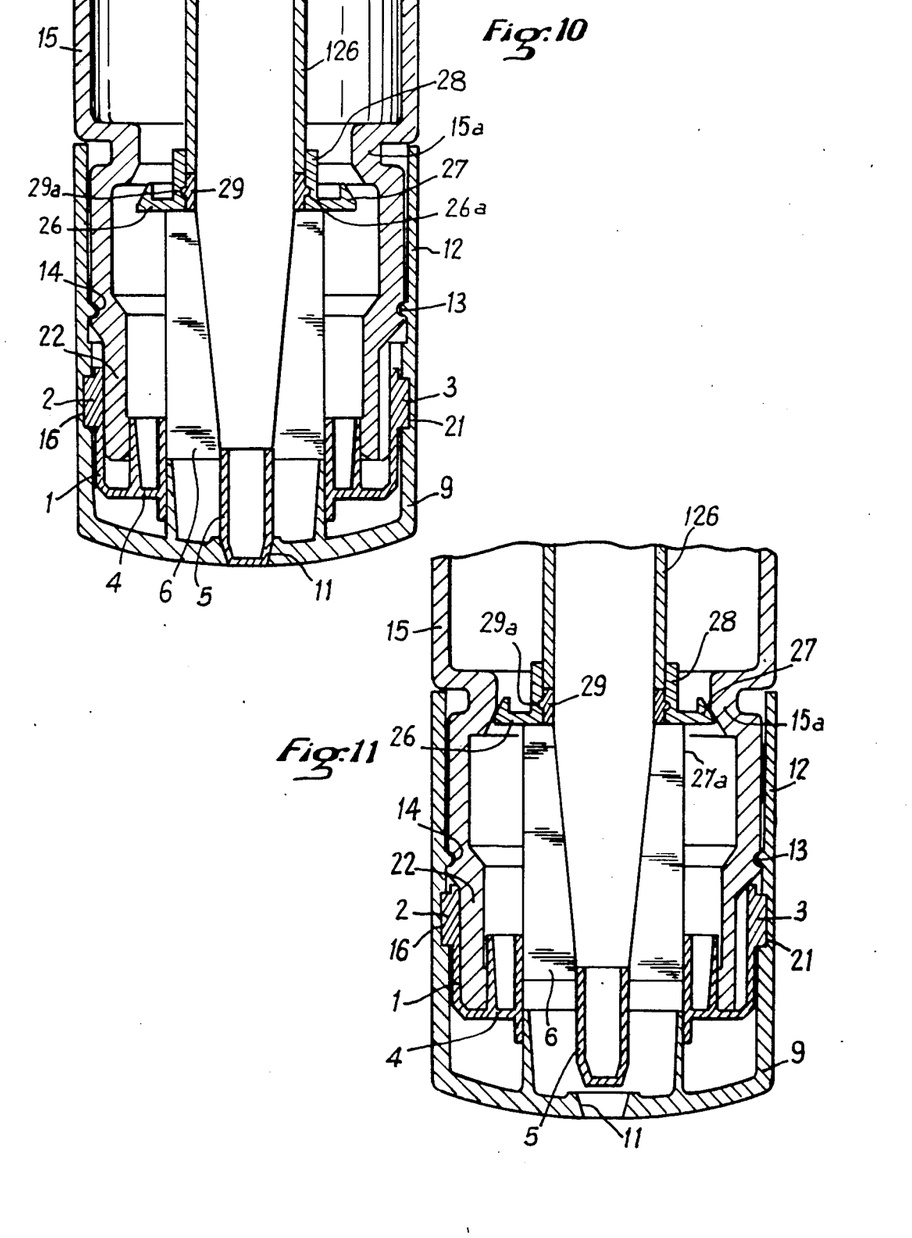
FIG. 10 is a vertical cross-section showing in a closed position the obturating device placed upside-down and comprising a dosing means.
FIG. 11 shows the same device as that of FIG. 10 in an opened position.

In FIGS. 10 and 11, a rotation of the casing 9 by a quarter of circumference causes the inner valve-cap 1 to raise and to fall, respectively: When the valve-cap 1 raises, it opens the hole 11 of the casing, and when the valve-cap 1 falls, it closes the hole 11.

The obturating device also comprises a dosing means which comprises, besides the casing 9 and the valve-cap 1 as hereinabove described, a foot-valve 26 and an air intake tube 126. In this case, and as shown, the obturating device must be used up-side-down.

The radial blades 6 of the valve-cap 1 are extended and support a collar 29 forming a plain ring 29a. The plain ring 29a when it is mounted, is engaged in an upper groove 26a of the foot-valve 26 which is itself provided on its outer periphery with a flexible bearing member 27 and a central skirt 28 surrounding the air intake tube 126.

The flexible bearing member 27 of the valve-cap 1 is applied, in a closed position of the obturating device, against an inner protrusion or seat 15a of the neck of the tube or flask 15 (see FIG. 11). In an open position, a communication is made betwee the inside of the tube or flask 15 and the head of the valve-cap 1 (see FIG. 10).

For assembling together the parts of the obturating device of FIGS. 10-11, the foot-valve 26 is engaged on the collar 29 of the valve-cap 1 by means of the groove 26a of the foot-valve 26 engaged on the plain-ring 29a of the collar 29.

The air intake tube 126 is forced in the central skirt 28 of the foot-valve 26. The whole unit placed in the casing 9 is engaged on the flask 15.

The dosing means being fixed with the obturating device works together with the obturating device.

The flask being placed up-side-down as shown in FIG. 10, the product contained in the flask goes down within the valve-cap 1. Then by rotating the casing 9 in the opening direction of FIG. 11, the outlet hole 11 for the product is opened together while closing the foot-valve 26 which confines a dose of the product within the valve-cap 1. By a pressure movement exerted by the user on the flask which is then flexible, or by mere gravity, this dose is ejected.

By turning the casing 9 in the closing direction of FIG. 10, the outlet hole 11 for the product is closed and the foot-valve 26 is opened to form a new dose within the valve-cap 1.

The extruded and thin walled air intake tube 126 has two main functions:

upon forming the dose within the valve-cap 1, the tube 126 enables air confined in the valve-cap 1 to raise up to the bottom of the flask, the flask being maintained up-side-down.

in relation with a pressure exerted by the user on the flask or by mere gravity the tube 126 will channel air from the bottom of the flask to the valve-cap 1 for ejecting the dose.

Figure 12:
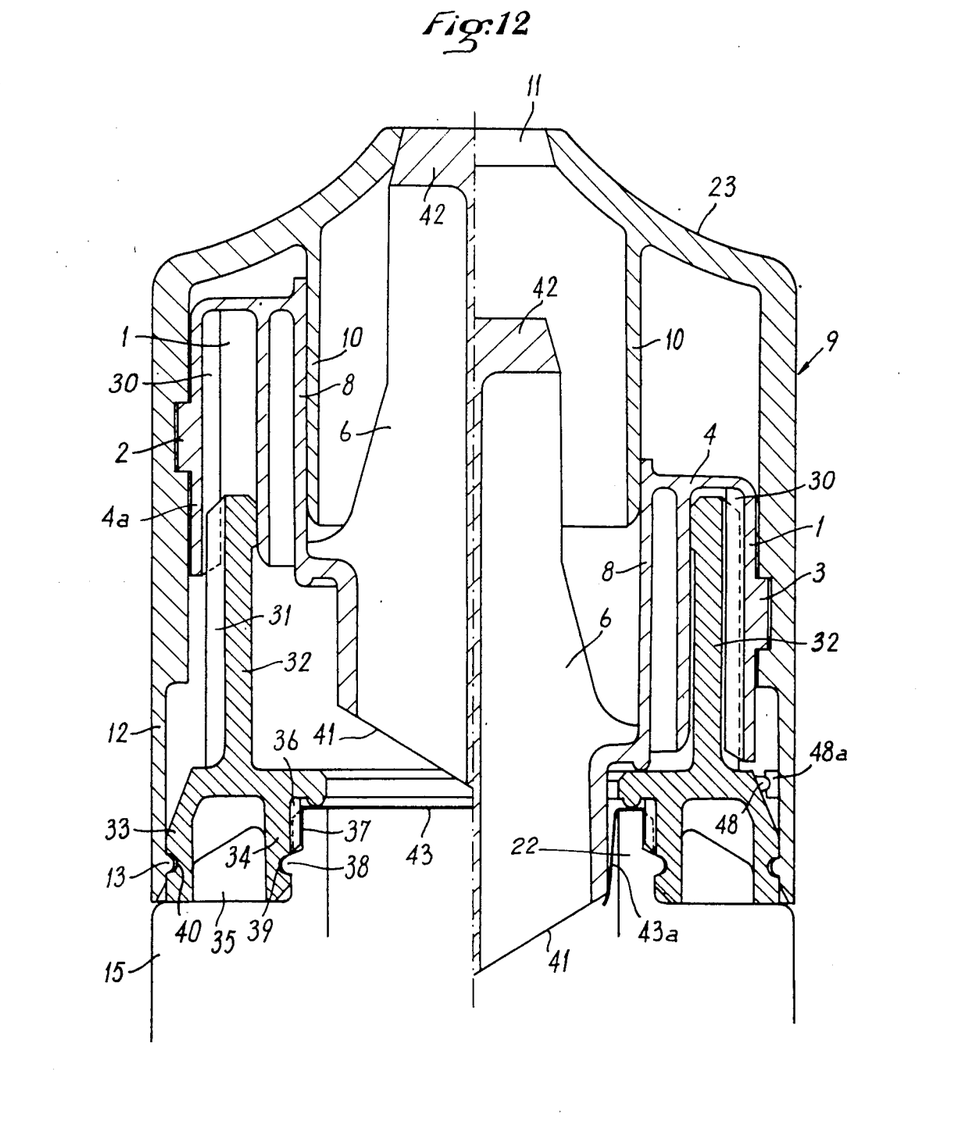
FIG. 12 shows two half cross-sections of the obturating device in a particular application.

In FIG. 12, and as in the preceding embodiments, the device comprises a valve-cap 1 mounted on a neck 22 of a flask 15 and a rotating casing 9 covering the valve-cap 1 and the neck 22. The valve-cap 1 forms an annular top portion 4 from which are formed the blades or cross-members 6 protruding in the outlet passage of the liquid contained in the flask 15. Outerly, the valve-cap 1 is downwardly extended in a fitting skirt 4a having an outer periphery provided with diametrically opposed side notches 2, 3.

The casing 9 has a central hole 11, and forms an outer fitting skirt 12 with an inner wall having ramps in which can slide the diametrically opposed side notches 2, 3 of the valve-cap 1.

The casing 9 also forms an inner tightness skirt 10 which is applied against a tightness skirt 8 of the valve-cap 1 and from the bottom of which are extended the blades or cross-members 6.

The valve-cap 1 innerly forms grooves 30 engaged with ribs 31 externally formed on a supplemental port forming a sleeve 32. The sleeve 32 forms at its bottom portion two collars 33, 34 encasing an annular protrusion 35 of the flask 15. In order to prevent a rotation of the sleeve 32 with respect to the flask 15, grooves and ribs 36, 37 are advantageously provided. Moreover, a pad 38 of the flask enters a groove 39 of the collar 34 for axially locking the sleeve 32.

The collar 33 is outerly provided with a groove 40 for the horizontal plain ring 13 of the casing 9 which can therefore be rotated without sliding. In this manner, the valve-cap 1 raises or falls when the casing is rotated by moving the opposed notches 2 and 3 in the ramps provided in the fitting skirt 12 of the casing 9.

When not in use, and as shown in the left-hand side of FIG. 12, the flask 15 is closed by a membrane-shaped lid 43, made for example in aluminium or in plastics material, for perfectly isolating the product contained in the flask 15.

Some at least of the radial blades 6 form, at their lower part, a cutting edge 41 and carry, at their upper part, a plug 42 for closing the central hole 11 in a quite similar manner as in the preceding embodiments.

When is desired to use the product contained in the flask 15, it suffices to rotate the casing 9 in the direction for which the ramps of the skirt 12 act on the notches 2, 3 to make the valve-cap 1 to go down, with the valve-cap 1 being axially guided by the grooves 30 and ribs 31. The going-down movement of the valve-cap 1 causes a going-down movement of the blades or cross-members 6 so that the cutting edges 41 will cut the lid 43 and camber the lid 43 as this is shown at 43a on the right hand side of FIG. 12. Simultaneously, the plug 42 is lowered so that the hole 11 is freed to enable the product contained in the flask 15 to be outwardly directed by following the tightness skirts 8 and 10. The flask 15 can then be closed by means of the obturation device by rotating the casing 9 in an opposed direction.

It is also possible that the blades or crossmembers 6 suppport other secondary components than the plug 42 of the various embodiments and cutting edges 41. The plug 42 could, for example, be substituted by a small stick or brush, the cutting edges 41 being either maintained or not.

Figures 13, 16:
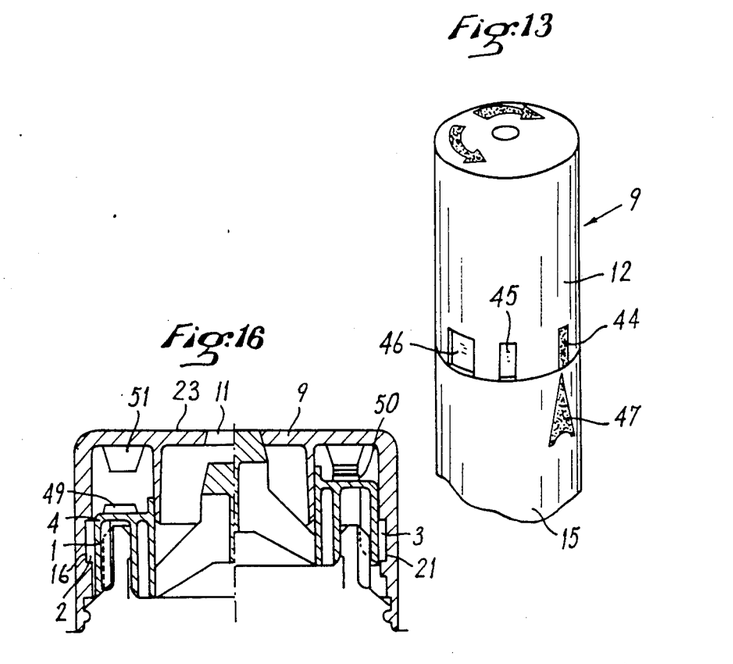
FIGS. 13–15 are partial perspective views showing means for controlling a fluid output in various particular positions.
FIG. 16 shows two vertical half cross-sections of the obturating device of the preceding figures provided with complementary means.
Figure 14:
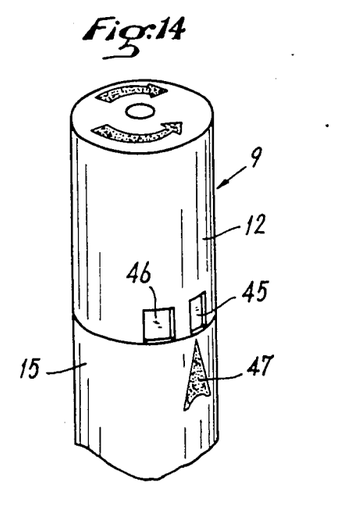
Figure 15:
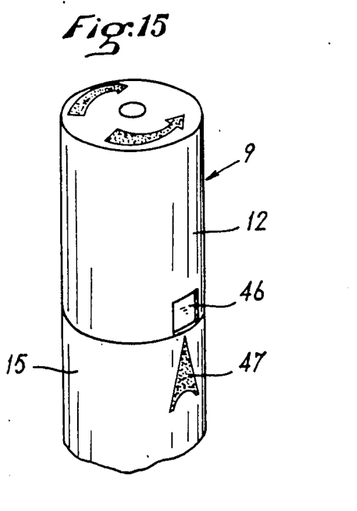

FIGS. 13-15 show that the skirt 12 of the casing 9 of anyone of the preceding embodiments have marking elements formed by a protruding rod 44, a notch 45 of a small width and a notch 46 of a greater width. Besides, the flask 15 has a mark 47 shown by an arrow.

By making the protruding rod 44 to coincide with the mark 47 of the flask 15, the casing 9 is placed for ensuring a proper closing of the flask 15 by cooperating with the plug 42 of the obturating device, as for example illustrated by the plug 42 as shown on the right hand side of FIG. 12.

Making the smaller width notch 45 to coincide with the mark 47, corresponds to a position for which the valve-cap 1 is only slightly moved and, consequently, the output of liquid is small between the plug and the mouth of the casing 9.

Finally, making the greater width notch 46 to coincide with the mark 47, corresponds to the position of full-output of the liquid illustrated for example on the right hand side of FIG. 12.

Other intermediary positions can be provided without departing from the scope of the invention.

Samely, one or a plurality of centering studs 48 (FIG. 12) can be provided on the flask 15 to correspond to recesses 48a of the casing 9 in order to form hard points corresponding to positions of the notches 45 and 46.

According to FIG. 16, the top portion 23 of the plate 4 of the valve-cap 1 is provided with fins 49, 50 which are preferably aligned vertically with the notches 2, 3. The fins 49, 50 are chosen of a sufficient thickness to resist to lateral thrusts without deformation.

The bottom portion of the casing 9 comprises a flexible pawl 51 suitably placed with respect to the upper end of one of the ramps 16, 21 in which are placed the notches 2, 3.

When the casing 9 is in a closing position (screwing direction), the flexible pawl 51 is placed behind one of the fins 49 or 50, which locks the casing 9 with respect to the valve-cap 1; such a locking action being sufficient for preventing a rotation of the casing 9 under effect of vibrations caused for example by transportation of the flask 15. Flexibility of the pawl 51 is however sufficient for being temporarily distorted, which enables the pawl 51 to overpass the abutment formed by one of the fins 49, 50 during the movements (unscrewing direction) made for opening the flask 15. The two above described locking and unlocking positions are shown on the right part and the left part, respectively of FIG. 16.

What is claimed is:

1. An obturating device for a tube, flask and like container having a neck with an inner edge and an outlet passage, wherein the obturating device comprises
a valve-cap and a casing; said valve-cap having a plate provided with an upper part;
a secondary component protruding at said upper part;
a set of maintaining blades protruding in middle of the outlet passage of the container in order to maintain in place said secondary component;
a fitting skirt for said neck, with said fitting skirt downwardly extending said plate of said valve-cap and comprising an outer periphery;
said valve-cap further having an inner cylindrical tightness skirt and a second tightness skirt, with said second tightness skirt being slightly tapered downwardly and applied against said inner edge of said neck;
said casing comprising a substantially plane upper plate having a central hole and an outer fitting skirt comprising an inner periphery;
said outer periphery of the fitting skirt of said valve-cap and said inner periphery of the outer fitting skirt of said casing having a complementary notch-ramp structure for an alternate reciprocating engagement and disengagement of said secondary component of said valve-cap into and from said hole of said substantially plane upper plate of said casing;
said casing having an inner part provided with a tightness skirt, said tightness skirt being slightly tapered downwardly and applied against said inner cylindrical tightness skirt of said valve-cap;
said upper part of the valve-cap being further provided with first fin means cooperating with second fin means mounted in the casing to prevent any rotation of the casing during transportation of the container, whereby opening and closing of the device are respectively made by a positive rotation of the casing in one and another direction with a suitable tightness in rotation being provided by said tightness skirts.

2. A device as set forth in claim 1, wherein said secondary component is formed by a plug for closing the hole of the casing.

3. A device, as set forth in claim 1, wherein some at least of said blades have a cutting edge.

4. A device as set forth in claim 1, wherein the casing comprises horizontal plain ring means cooperating with horizontal groove means of the neck of the container, whereby the casing is rotatively positioned in height on said neck.

5. A device as set forth in claim 1, wherein the valve-cap comprises horizontal plain ring means cooperating with horizontal groove means of the neck of the container, whereby the valve-cap is rotatively positioned in height on said neck.

6. A device as set forth in claim 1, wherein the complementary notch-ramp structure is formed by two opposed notches provided on an outer periphery of said fitting skirt of said valve-cap and two symmetrically opposed inner ramps provided on the outer fitting skirt of said casing with said notches engaging said ramps.

7. A device as set forth in claim 1, further including dosing means with said dosing means comprising a foot valve cooperating with an inner seat of said neck of the container, and an air intake tube provided to make a bottom part of said container to communicate with an inner part of said valve-cap when the container is positioned up-side-down.

8. A device as set forth in claim 7, wherein the blades of said valve-cap are downwardly extended with a collar being mounted at base of said blades said collar having plain ring means and said foot valve having inner groove means cooperating with said plain ring means.

9. A device or set forth in claim 7, wherein said foot valve has an outer periphery provided with a flexible skirt and a central part provided with a skirt closely surrounding the air intake tube.

10. A device as set forth in claim 7, wherein a rotation of the casing in an opening direction disengages said secondary component from said hole and engages said foot valve on said inner seat whereby separating a dose of product which is ejected by a pressure applied on a wall of said container, and wherein a rotation of the casing in a closing direction engages said secondary component into said hole and disengages said foot valve from said inner seat whereby forming a new dose of the product.

11. A device as set forth in claim 1, wherein the blades form cutting edges as said secondary components.

12. A device as set forth in claim 11, wherein said cutting edges are extended above a membrane shaped lid mounted on the container.

13. A device as set forth in claim 11, further comprising a sleeve, said sleeve having an inner and an outer collar with said inner collar being mounted on said neck of the container.

14. A device as set forth in claim 13, wherein a rib and groove means are formed on said sleeve and said valve-cap for axially guiding said valve cap.

15. A device as set forth in claim 13, wherein a rib and groove means are formed on the inner collar of said sleeve and said neck of said container for preventing a rotation of said sleeve when means are provided for axially locking said sleeve on the container.

16. A device as set forth in claim 1, wherein said outer fitting skirt of the casing is provided with first marking elements, at least one second marking element being provided on the container whereby defining at least one of a closed position, an intermediary position and a completely open position.

17. A device as set forth in claim 16, wherein said first marking element is one of a protruding small rod, a narrow groove and a wide groove.

18. A device as set forth in claim 16, wherein said second marking element is an arrow.

19. A device as set forth in claim 1, wherein at least one recess and stud means are provided on said casing and said container for forming at least one hard point corresponding to at least one of a plurality of opening positions.

20. A device according to claim 1, wherein the substantially plane plate of the casing is extended by a long tapered shaped part.

21. A device as set forth in claim 1, wherein said complementary notch-ramp structure is so designed as to enabling closing and opening of the obturating device by a rotation of a quarter of circumference.

* * * * *

UNITED STATES PATENT AND TRADEMARK OFFICE
CERTIFICATE OF CORRECTION

PATENT NO. : 4,690,304
DATED : September 1, 1987
INVENTOR(S) : Simone MOREL

It is certified that error appears in the above—identified patent and that said Letters Patent is hereby corrected as shown below:

Col. 1, line 19: change "the" to --this--;

Col. 1, line 60: change "showng" to --showing--;

Col. 2, line 2: change "upside-down" to --up-side-down--;

Col. 2, line 32: change "extended" to --is extended--;

Col. 2, line 41: change "3" to --8--;

Col. 2, line 43: change "caasing" to --casing--;

Col. 4, line 31: change "port" to --part--.

Signed and Sealed this

Thirty-first Day of May, 1988

Attest:

DONALD J. QUIGG

*Attesting Officer*      *Commissioner of Patents and Trademarks*